United States Patent [19]
Whitford et al.

[11] Patent Number: 5,995,948
[45] Date of Patent: Nov. 30, 1999

[54] CORRESPONDENCE AND CHARGEBACK WORKSTATION

[75] Inventors: Thomas E. Whitford; Ashit AtulKumar Dave, both of Newark; David A. Rosenblatt, Bear; Margaret J. Stapleton, Newark, all of Del.

[73] Assignee: First USA Bank, N.A., Wilmington, Del.

[21] Appl. No.: 08/975,685

[22] Filed: Nov. 21, 1997

[51] Int. Cl.[6] .................................................. G06F 17/60
[52] U.S. Cl. ................................................................ 705/41
[58] Field of Search ..................... 235/379, 380; 186/35, 37; 379/91.01; 705/7, 26, 34, 38, 40

[56] References Cited

U.S. PATENT DOCUMENTS

| | | | |
|---|---|---|---|
| 4,797,911 | 1/1989 | Szlam et al. | 379/88.22 |
| 5,225,978 | 7/1993 | Peterson et al. | 705/33 |
| 5,239,462 | 8/1993 | Jones et al. | 705/38 |
| 5,383,113 | 1/1995 | Kight et al. | 705/40 |
| 5,402,474 | 3/1995 | Miller et al. | 379/93.12 |
| 5,446,740 | 8/1995 | Yien et al. | 395/200.77 |
| 5,481,647 | 1/1996 | Brody et al. | 706/11 |
| 5,523,942 | 6/1996 | Tyler et al. | 705/4 |
| 5,551,021 | 8/1996 | Harada et al. | 707/104 |
| 5,566,330 | 10/1996 | Sheffield | 707/4 |
| 5,568,489 | 10/1996 | Yien et al. | 395/200.77 |
| 5,592,378 | 1/1997 | Cameron et al. | 705/27 |
| 5,603,025 | 2/1997 | Tabb et al. | 707/2 |
| 5,608,789 | 3/1997 | Fisher et al. | 379/201 |
| 5,611,052 | 3/1997 | Dykstra et al. | 705/38 |
| 5,652,786 | 7/1997 | Rogers | 705/40 |
| 5,826,250 | 10/1993 | Trefler | 705/33 |

*Primary Examiner*—James P. Trammell
*Assistant Examiner*—Mussie Tesfamariam
*Attorney, Agent, or Firm*—Hunton & Williams

[57] ABSTRACT

The present invention is a process that includes a graphical user interface, a client-server design and computer telephony integration to enhance the quality and productivity while reducing training in the correspondence and chargeback operations. The process uses a data index component of a scanned or computer-output image to automate interaction with an intelligent workstation used by a customer service representative. The system uses business rules and accesses other data to provide rapid and high quality disposition of cases. The image document can be resolved with minimum or no human interaction.

20 Claims, 5 Drawing Sheets

CORRESPONDENCE AND CHARGEBACK WORKSTATION

FIELD OF THE INVENTION

The invention generally relates to computerized information management and processing systems. More particularly, the process utilizes a data index component of a scanned or computer-output image to automate interaction with an intelligent workstation used by a customer service representative.

BACKGROUND OF THE INVENTION

Ensuring the accuracy of the amount charged to a consumer's account is one of the most important roles of a customer service representative's job. A customer service representative must be adequately trained to resolve disputes, fulfill requests or simply answer questions about a consumer's account. These tasks must be performed by the representative in a quick, reliable, friendly and efficient manner. In order to achieve these objectives successfully, the customer service representative should be knowledgeable of the company's most recent business policies and practices; should know how to apply these rules consistently; should be able to identify and address the consumer's issues or concerns consistently; should have the capacity to accurately analyze the consumer's records and should know how to utilize this information to resolve the current issues.

In the consumer service field, various devices have been implemented to address consumer concerns and requests. Although various improvements have been achieved, a need still exists to automatically apply a company's current business rules to consistently resolve a consumer's request concerning the amount, the fees, the interest rates charged to his or her account or other inquiries. Prior to the present invention, when updating an account, customer service representatives were required to use a mainframe session emulation window to enter complex computer commands. Customer service representatives also had to participate in extensive training to learn business policies and procedures. VISA™ and MASTERCARD chargeback regulations were especially complex, and the representatives had to use reference manuals to understand, interpret and apply the regulations. Changes to business policies and VISA™/MASTERCARD regulations were communicated via bulletins or through training updates. Daily reports, requiring up to five full time employees to complete, were produced by the credit card processing service to research accounts and to determine actions such as issuing credit balance refunds, correcting processing errors, or sending a VISA™/MASTERCARD transaction within a certain time frame.

SUMMARY OF THE INVENTION

The First Image System is an automated chargeback and correspondence processing apparatus. The system is a point-and-click Graphical User Interface (GUI) process. The process utilizes a data index component of a scanned or computer-output image to automate interaction with an intelligent workstation used by a customer service representative to navigate a work case.

First Image provides quality service to both the consumer and the representative by embedding complex rules and decision trees into an intuitive and accurate service platform. The process incorporates policies and procedures from multiple areas within the organization, supports multi-departmental needs and provides account activity updates to the organization's other departments.

The overall philosophy of the First Image development process was to improve cardholder satisfaction with fast and accurate resolution of his or her issues. Presently, the resolutions are made without transferring the case to other departments. The power of the workstation enables the system to handle complex policies and procedure both internal and external to card member service.

First Image delivers significant productivity benefits through its rapid delivery of consolidated customer service information. The system provides a common repository for all applicable policies and procedures, facilitating in the delivery of a uniform service experience that is consistent with business-wide policies and objectives. Embedding policies within the system and workflow logic:

clearly and concisely displays account information to the customer service representative, applies consistent account-specific logic to policy decisions, thereby minimizing individual errors in judgment, and reduces the need for memorization of complex procedures.

The system performs, with minimum input from the representatives, account specific mathematical calculations which results in highly accurate and efficient servicing. Examples of key support functions include:

complex finance charge adjustments, consolidation of fee adjustments, and date calculations.

First Image automatically tracks all actions taken on an account. The data collected provides the ability to perform in-depth analysis of the correspondence. Test and control populations can be easily defined based on analysis of the data to identify specific populations with common characteristics or behavior patterns. Measurement of test and control responses is easily incorporated into existing correspondence tracking scheme, allowing for rapid testing and deployment of new programs, policies and procedures.

All data tracked by First Image is written to a database which is accessible throughout the corporation for analysis, and which can be integrated with the data warehouse for the thorough research of consumer behavior patterns. This data is used extensively to understand the company's business environment, optimize existing processes or develop new ones. A myriad of reports can be developed using the data collected to observe trends, measure effectiveness of a given program and identify issues.

Implementation of First Image will dramatically reduce the training time necessary for customer service representatives to achieve and maintain systematic proficiency. The intuitive structure of the graphical interface allows customer service representatives to fully utilize new functionality with little or no formal instruction, and the "point-and-click" item selection has eliminated the effort required to master a command-based environment. Intelligent design of First Image has almost eliminated training sessions to support system changes. The robust nature of the interface allows most systematic alterations to remain invisible to the user, and those enhancements that are seen are designed to be intuitive enough for customer service representatives to begin using immediately, often without classroom training.

First Image has enabled a significant decrease in the time required for customer service representatives to master policy and procedure changes. The automated process has greatly simplified the steps required to perform common account maintenance such as sending letters and documenting activities.

The system interface supports consumer service-wide policy changes. Account level decisioning can result in prompts that instruct customer service representatives on topics such as product type and associated benefits. These features provides customer service representatives with access to a vast amount of account-specific information, which can be updated on-line with little effort.

In the new system, business policies are automatically enforced and are used to guide the customer service representatives as they use the system. VISA™ and MASTER-CARD regulations are embedded in an expert system, which automatically asks appropriate questions and generates the correct disposition. Changes to business policies and VISA™/MASTERCARD regulations are implemented in the systems so they are centrally and automatically distributed and enforced. Further, the system comprises the capability to handle non-image document request, for example, a telephone call requesting a credit limit increase.

The present invention comprises an "auto resolve" mode which automatically downloads reports, pulls account data, and dispositions the account accurately based upon the business rules in the system. Employees are only required to review more challenging exceptions or cases which fall into 'gray' areas.

The new system automatically works the queues, provides an interface between the applications, and closes the case through background processing. This simplifies the customer service representative's work to reduce and improve productivity.

The system combines image processing with "in-house developed business rules" and accesses other data to resolve a consumer's request. The user interface was designed to be intuitive—using color, optimized layout, and translated codes. Productivity is enhanced by the elimination of keystrokes and manual intervention. The interface enriches and empowers the employee's jobs by allowing them to focus on serving the consumer and by providing powerful tools to eliminate simple and repetitive tasks.

One objective of the present invention is to create an Auto Resolve process to automatically resolve inbound correspondence using business rules and pre-process the disposition of unresolvable cases.

Another objective is to create a single work queue with all work to allow operational efficiency and flexibility.

Another objective is to enhance the engine to allow 'stacking' of work, backward navigation, an interactive training mode, generic and automatic workflow triggers, and conscious work commit option.

It is still a further object to create multiple high-level engine modes to accommodate the Universal Workstation.

Another objective is to create letter paragraphs to be accumulated by workflow logic in addition to memos, tracking, and workflow transactions.

Another objective is to create a user interface which is intuitive, productive; thus, it empowers and enriches the customer service representative's jobs.

It is still a further object to utilize external table driven and rule driven strategies to implement business area maintenance of most system changes.

Another object is to re-engineer processes to reduce cycle times, improve consumer satisfaction, reduce handoffs and cycle times, and implement policies from the Customer Management System (CMS).

DETAILED DESCRIPTION OF PREFERRED EMBODIMENTS

Figure 1:
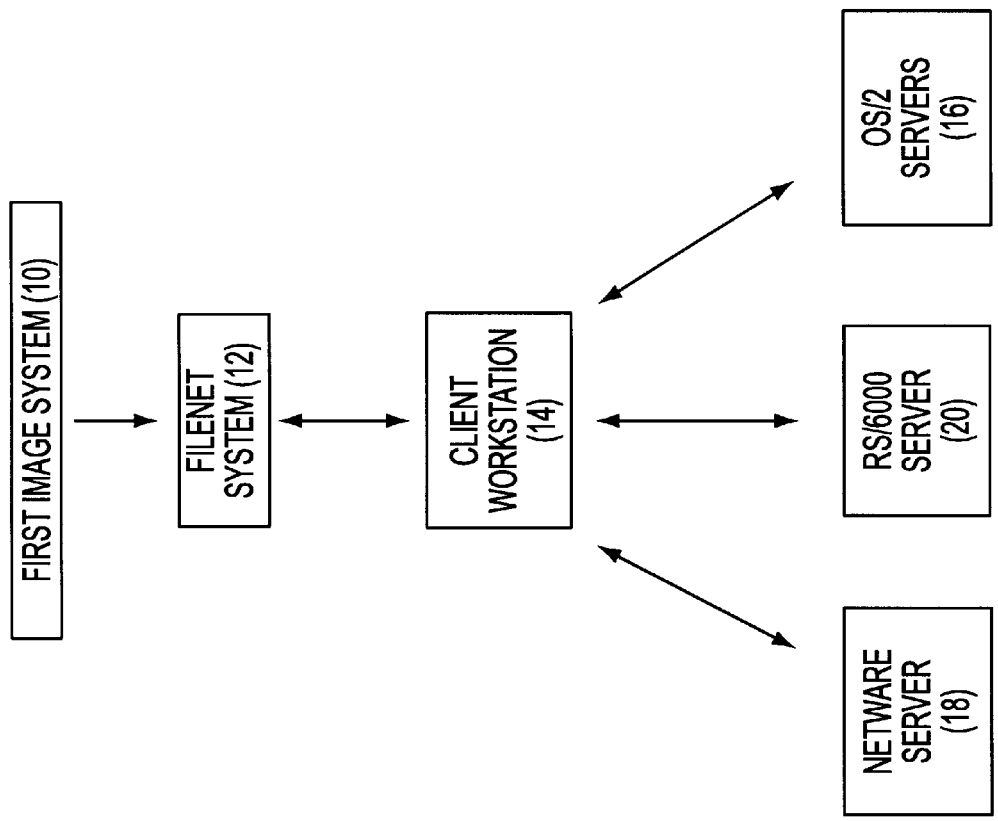
FIG. 1 is a block diagram of a First Image System according to the present invention.

Referring to FIG. 1, the First Image System (10) is an automated chargeback and correspondence processing apparatus as shown. The system (10) includes a FileNet system (12), a Client Workstation (14), a Netware server (18), RS/6000 Servers (20) and OS/2 Servers (16). The FileNet system (12) is the data entry processing center. The Client Workstation (14) is the workstation where the work is performed. The Netware server (18) is where all the codes and tables of the system (10) reside. The RS/6000 Servers (20) handle the communication between the Client Workstation (14) and a credit card processing center (22). OS/2 Servers (16) are the operating systems of the servers that collect the credit bureau information from the local credit scoring mainframe.

The system (10) begins to operate when a batch of consumer's requests are received. The incoming information is received and prioritized by the FileNet System (12). Then, the information is transferred from the FileNet System (12) to the Client Workstation (14) where the resolution of the consumer's request is performed. In order to resolve the consumer's request, the Client Workstation (14) accesses the Netware (18), the RS/6000 servers (20) and the OS/2 Servers (16) to retrieve additional account information. Once the request is resolved, the system (10) automatically generates a letter to the consumer detailing the disposition of the request.

Figure 2:
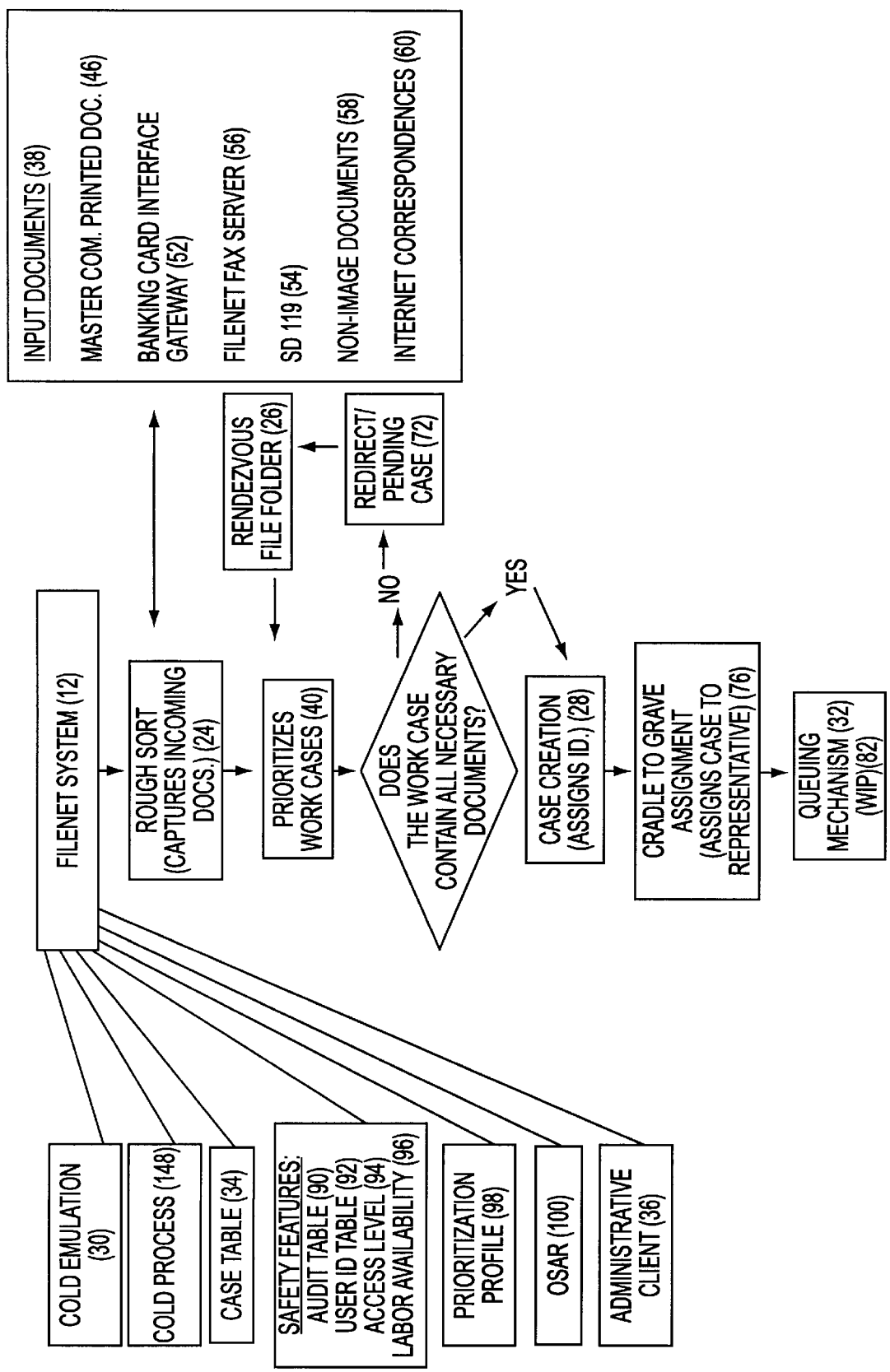
FIG. 2 is a block diagram of a FileNet system according to the present invention.

The FileNet system (12), as shown in FIG. 2, contains a Rough Sort (24), a Rendezvous feature (26), a Case Creation (28), a Cold Emulation (30), a queuing mechanism (32), a Case Table (34), safety features, Prioritization Profiles, and an Administrative Client (36). The FileNet system (12) captures the incoming documents (38), prioritizes the work case (40), assigns the case to a customer service representative and pushes the work in a single queue to the representative to be worked on. A work case (40) is one or more documents related to a consumer issue. For example, a case may contain the consumer's original letter disputing the charged amount, the draft document requested by the system (10) from VISA™, perhaps, a response letter generated by the system sent to the consumer stating that their request is being addressed, and a final disposition letter summarizing what actions were taken to resolve the matter.

The Rough Sort (24) is the core processing unit of the FileNet system (12). The work cases (40) flow into and out of the system through the Rough Sort (24). The sources of input documents (38) delivered to the Rough Sort (24) may be of several different forms. The input documents may be a image or non-image document. Various sources of input are delivered to the system (10) as image documents. The image documents may be MasterCom Printed documents (46) which are letters written by the consumer that are delivered to a post office box. These correspondences (46) are scanned and indexed into the system to become image documents. Image documents which are automatically committed directly into the systems are inbound/outbound faxes which are Banking Card Interface Gateways (52), and SD 119 reports (54). The Banking Card Interface Gateways (52)

are the credit card receipts retained by a store or merchant which a consumer signs guaranteeing to pay the listed amount when a product is purchased or a service is rendered. The banking cards are credit cards or transaction cards (i.e., VISA™, MASTERCARD) which are issued from banks or other financial lending institutions to consumers. The Banking Card Interface documents (52) are directly committed into the system through the gateway. The system (10) handles incoming correspondence (60) from the Internet. The system design allows correspondences to be transmitted from the Internet to the system (10). The daemon program (64) takes documents from the mail queue and commits them to optical laser discs.

Other sources of input directly committed into the system are received from the FileNet Fax Server (56) and SD 119 reports (54). A typical document that may be received as a FileNet Fax is a consumer billing dispute letter. SD 119 reports (54) are representment reports which are loaded into the queuing mechanism (32) and are navigated by the representative as the work case (40) is processed. A re-presentment report is generated, for example, when the system (10) performs a chargeback to a consumer's account because the consumer's disagrees with the charged amount and the merchant is unable to supply a copy of the credit card or transaction receipt to dispute the consumer's claim. If the merchant finds the credit card or transaction receipt, at a later date, and information contained on the receipt is entered into the system (10), the system (10) retrieves all correspondences and requests associated with this work case (40) and represents the case (40) into the system to be reworked.

Furthermore, the FileNet system (12) is capable of accepting non-image documents so that they can also be processed by the customer service representative. The non-image documents are called Non-Queue Index and Document Data (58). An example of a non-queue index and document (58) is a telephone request (62) from a consumer to increase their credit limit. The telephone request (62) is transmitted from the FileNet Control Daemon (64) which is a subroutine of the Oracle Database (66) contained within the RS/6000 Server (20) to the Rough Sort (24). A Computer Telephony Integration (CTI) (68) provides the system (10) with the ability to interface to the phone switch.

Once the incoming document are stored within the Rough Sort (24), the Rough Sort (24) prioritizes the work flow and queues the next case to be handled by a customer service representative. If the case does not contain all of the information necessary to resolve the case, the Rough Sort (24) redirects the case or flags the case as a pending document (72) until the system (10) receives all the necessary documents. For example, if a consumer sends in a letter disputing a charge, the system (10) will redirect the case or make the case a pending case (72) until the system (10) receives the VISA™ credit card receipt slip from the Banking Card Interface Gateway (52). Once the additional information is received, the information is routed into a folder along with the consumer's letter by the Rendezvous feature (26). The Rendezvous feature (26) is where all existing documents or a new document are matched up with an existing document.

The Case Creation (28) creates a case identification code (Case ID). The case is assigned to a customer service representative by the Cradle to Grave Assignment (76). Then, the case is presented to the customer service representative for an automated resolution. The FileNet system (12) contains a single work queue for each departmental unit. The single work queue is accomplished by utilizing the FileNet system (12) queuing mechanism (32). The customer service representative enters the queuing mechanism (32) and work is "pushed" to them by the prioritizing algorithm. Also, the external non-image documents (58) are placed into the system's queue (32) as 'dummy' entries to be resolved by the customer service representatives. The Work-In-Process (WIP) queues (82) are work cases that are ready to be presented to the customer service representative.

Cold Emulation (30) is a real-time method of committing documents, such as the Ami Pro (84) letters into an image format. The Ami Pro Macro (86) is the word processor of the Client Workstation (14). Ami Pro (84) generates the consumer response letters. Throughout the process, Ami Pro (84) automatically compiles the greeting, salutation, and the written response which details the disposition of the consumer's inquiry. The Cold Process (148) takes the data records which are compiled onto computer output laser discs which are received from the credit card processing center (22) or mainframe (158) and transforms them into pseudo-image documents. For example, all monthly credit card-holder statements, for approximately the past 24 months, are stored on these discs. The data from the discs are processed through the Cold Process (148) and loaded onto the system (10) into the FileNet system (12). Should a request concerning a consumer's payment history enter the system (10), the system (10) accesses the Cold Process (148), the requested data is retrieved, downloaded and transferred to a printer. A copy of the consumer's payment history could then be sent to him or her.

The Case Table (34) is a table that keeps tracks of all the work cases (40). All actions taken on a consumer's account are automatically tracked by the system (10). The data collected provides the ability to perform in-depth analysis of the correspondences, to identify specific populations with common characteristics or behavior patterns or to measure and test the deployment of new programs, policies and procedures.

Some of the safety features offered by the system (10) are the Audit Table (90), User ID Table (92), Access Levels (94) and Labor Availability (96). The Audit Table (90) is a security feature that monitors user access to the system (10). Every time a user accesses an account, the system (10) logs the user's identification, who the user is and what actions were performed on the account by the user. The User ID Table (92) is a table that contains the identification of the different users who are capable of accessing the system. The Access Level (94) maintains the level of access in which a user is able to obtain. Another aspect of the systems' security features is the Labor Availability (96) which customizes the type of work cases (40) to be presented to the customer service representative, what type of work a representative can perform on a each work case and what type of work a customer service representative is capable of handling.

The Prioritization Profiles (98) enable the system (10) to retrieve work cases based upon certain profile information. With the Prioritization Profiles (98), the system can retrieve, for example, an individual work case, a group of similar work cases, work cases based upon a particular amount in controversy, or a particular type of case. The Optical Storage Arrays (OSAR) (100) are the files where the image documents are stored.

The Administrative Client (36) is the manager's or supervisor's file where managerial plans are implemented to set the priorities, load the rule tables and check the queue status. The Administrative Client (36) permits the managers or supervisors to review actions taken by the customer service representatives and to override those actions, if necessary.

Figure 3:
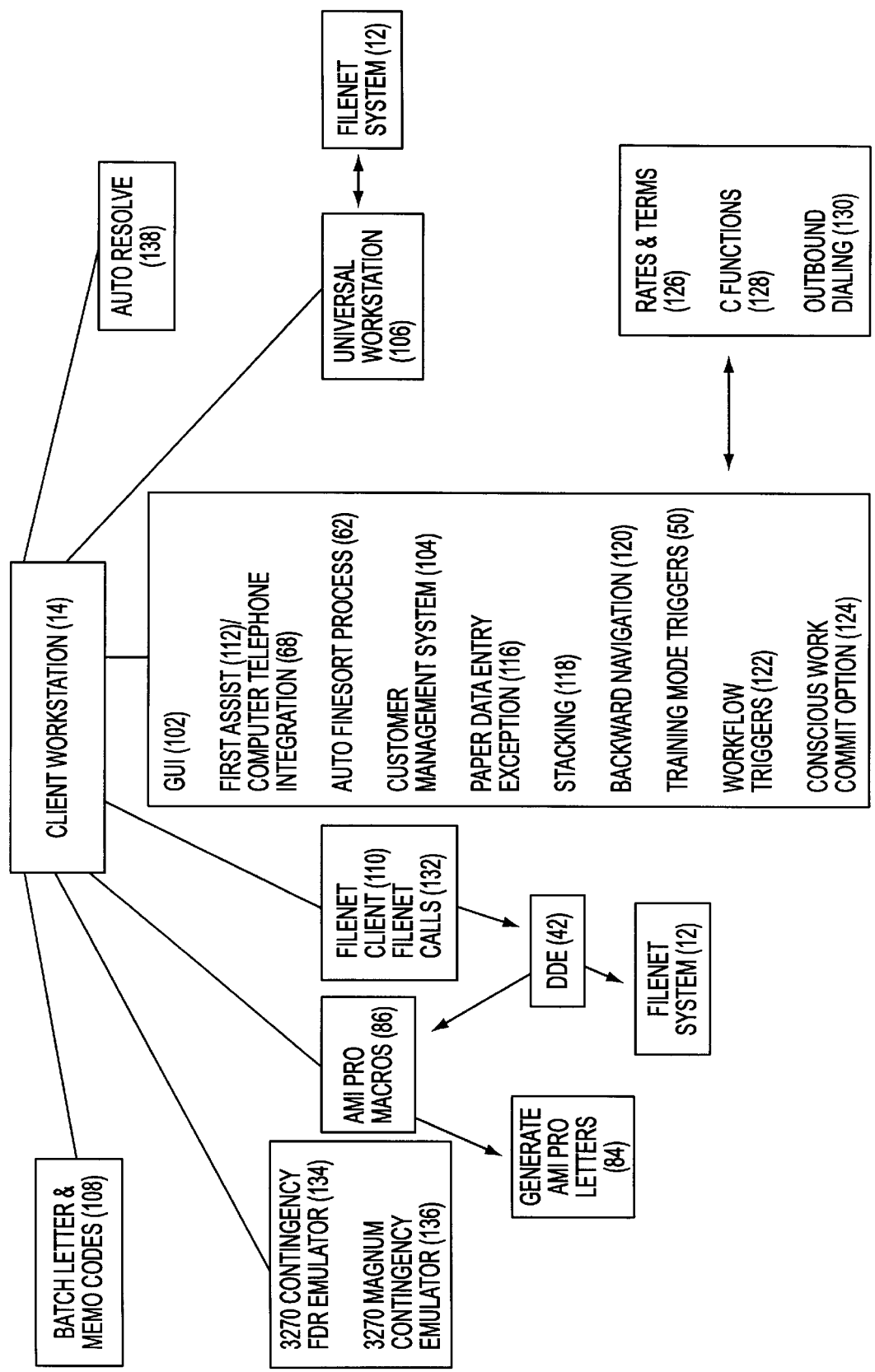
FIG. 3 is a flow diagram of a Client Workstation according to the present invention.

FIG. 3 illustrates the Client Workstation (14). The workstation (14) comprises the Graphic User Interface (GUI) (102), the Contingency Emulators (134, 136), the Universal Workstation, (106), Batch Letters Memo Codes (108), AMI PRO Macros (86), and FileNet Client (10) and the Auto Resolve (138).

The GUI (102) is the processing engine which enhances the system's (10) usability. Some of the features included within the GUI (102) are the ability to handle telephone calls, to handle incoming Internet correspondence, to receive data from different departmental units, to provide internal intranet-help services and to permit data paper entry. The Computer Telephony Integration (68) of the First Assist (112) subroutine provides the system (10) with the ability to interface to telephone switches. First Assist (112) is the phone system functionality. Should the customer service representative need any additional information, the system automatically dials the consumer's phone number to contact the consumer for the requested information. Also, should a telephone request be made to increase a consumer's credit limit, the consumer's request is received through the First Assist (112) subroutine.

The CMS (104) is an internal intranet service for the system (10) that contains the 'help function' and additional information, such as marketing programs and special offers. For example, while processing a work case (40), should the representative have a question about the procedures to process the work case (40) or about the system's (10) operation, the representative would simply click on the 'help' icon and the system would access the CMS intranet (104) where the 'help' subroutine is located.

Paper Data Entry Exception (116) allows the customer service representative to manually enter the account number into the system (10) and work from paper should the system's image processing capabilities fail.

Once a correspondence (58) is received into the system (10), the correspondence is normally indexed by account number. If an account number is not available or the correspondence (58) is from a non-cardholder, the Auto Finesort Process (62) indexes the correspondence by name and address or magnum inquiry number. A magnum inquiry number is a reference number assigned to a request to receive a credit account which is denied. A request to receive a credit account which is approved is assigned an account number. If a consumer who was denied the credit account request challenges or disputes the denial, the original request is retrieved from the system's database by its magnum inquiry number. The system (10) will automatically use this alternate information to perform a search and to display the search results. The customer service representative can point and click on the search results to quickly access the account information. This process saves the user from manually keying search arguments.

Some of the features incorporated into the GUI (102) to enhance the system's (10) usability are stacking (118), backward navigation (120), an interactive training mode (50), generic and automatic workflow triggers (122) and conscious work commit option (124). The program language of the GUI (102) is Easel and the language of the tool kit is 'C'. Stacking (118) allows the user to place their work on hold temporarily and perform other work assignments. Backward Navigation (120), workflow triggers (122) and training mode (50) permit the user to go backward and correct mistakes, to trigger generic actions that are frequently used, and to enter a training mode with a SuperScript that directs the customer service representative as to what procedures to perform, respectively. The conscious work commit option (124) is an end-of workflow screen that presents the end-disposition and queued transactions to the customer service representative for a final review and confirmation prior to posting for quality assurance.

Some of the supporting subroutines for the GUI (102) are the rates & terms (126), C Functions (128) and Outbound Dialing Interface (130). The account rates and terms subroutine provides the representative instantly with a pop-up screen of the account's current rates and the terms. The pop-up screen displays the account information in a format which is easy to read and understand. This feature improves the representative's (10) productivity because often the rates and terms of credit card accounts are written in very complicated and legal terminology which is very difficult to understand. Furthermore, individual rates and terms vary depending upon the type of account a consumer may have. The system's design utilizes C functions (128) to perform transactions involving complex calculations or external system calls.

The Outbound Dialing Interface (130) is the ability to call the consumer for additional information, if needed. The system (10) interfaces to a dialer which provides a listing of numbers to dial, the out-bound dialer automatically dials the consumer's number. If someone answers the telephone call, a pop-up screen of the account automatically appears upon the representative's personal computer.

The Universal Workstation (106) is based upon the number of items in queue and upon the incoming phone volume. Based upon these factors, customer service representatives may be added or removed from the system (10), as needed. The system (10) has a 'high level' mode to accommodate the Universal Workstation (106). This means that the navigation rules are indexed at a level that can be overriden in the future with a higher level driver such as the Universal Workstation (106). The Universal Workstation (106) utilizes correspondence and chargeback rules with the call center business rules to create a combined application which can handle inbound telephones, outbound telephones, or correspondence work by adding or removing customer service representatives, as needed, by the system (10).

Batch Letters and Memo Codes (108) are transactions sent to credit card processing center (22) as the representative executes work case (40). Letters are is requested using a transaction which contains the account number, letter code, and letter variables. Memos are notations stored on the account for later reference. Memo transactions contain account number and memo text.

As the customer service representative navigates a work case (40), letter paragraphs, memos, action tracking, and transactions are accumulated by the Ami Pro Macros (86). The customer service representative commits these for processing at the end of the last workflow entered. Letter paragraphs are sent via the Dynamic Data Exchange (DDE) (42) to the Ami Pro wordprocessing package running in the background. DDE (42) is a protocol for programs to exchange data, and the AMI PRO Macros (86) is the word processor on the workstation. AMI PRO (86) generates the consumer response letters. Throughout the process, AMI PRO (86) automatically compiles the greeting, salutation, and the written response which details the disposition of the consumer's inquiry. The letter heading, salutation, and closing are also merged automatically. The customer service representative can further edit the letter or choose to close and print it. Letter paragraphs are used to generate only one letter if a card member has numerous issues. The card member will receive only one letter with all of the issues combined, instead of separate form letters.

FileNet Client (110) is the image access server which runs on the Client Workstation (14). The FileNet Client (110) performs the image display. It provides communication between the Image Access Server over to the DDE and accesses the FileNet system (12) to retrieve the next document and displays it on the system (10) for the customer service representative to work the case (40). ). FileNet Calls (132) are sent from the Client Workstation (14) to the FileNet system (12) to request data or perform a function, such as retrieving the next work case (40) account.

For example, once the document is displayed on the screen, the customer service representative reads the consumer's request, identifies the consumer's issue and navigates the work case (40) while the system (10) resolves the case, closes it out, logs it out with a resolution code. The customer service representative navigates the work case (40) by using the point-and-click feature of the GUI (102) to select selectable options displayed on the screen. If the system (10) is unable to resolve the case, the system (10) will pend it or redirect the case for manual resolution. The account data returns to the main program after the representative is finished working the case (40).

The 3270 Contingency FDR Emulator (134) and the 3270 Magnum Contingency Emulator (136) serve as backups for the systems. The 3270 Contingency FDR Emulator is the backup system for credit card processing center and the 3270 Magnum Contingency is the backup system for the credit scoring system. (136). Contingency means that these features provide the system (10) with the capabilities to continue operating should the image processing capabilities of the system fail. The representative may continue to enter a consumer's account manually from paper into the system and continue to process the work case (40).

Figure 4:
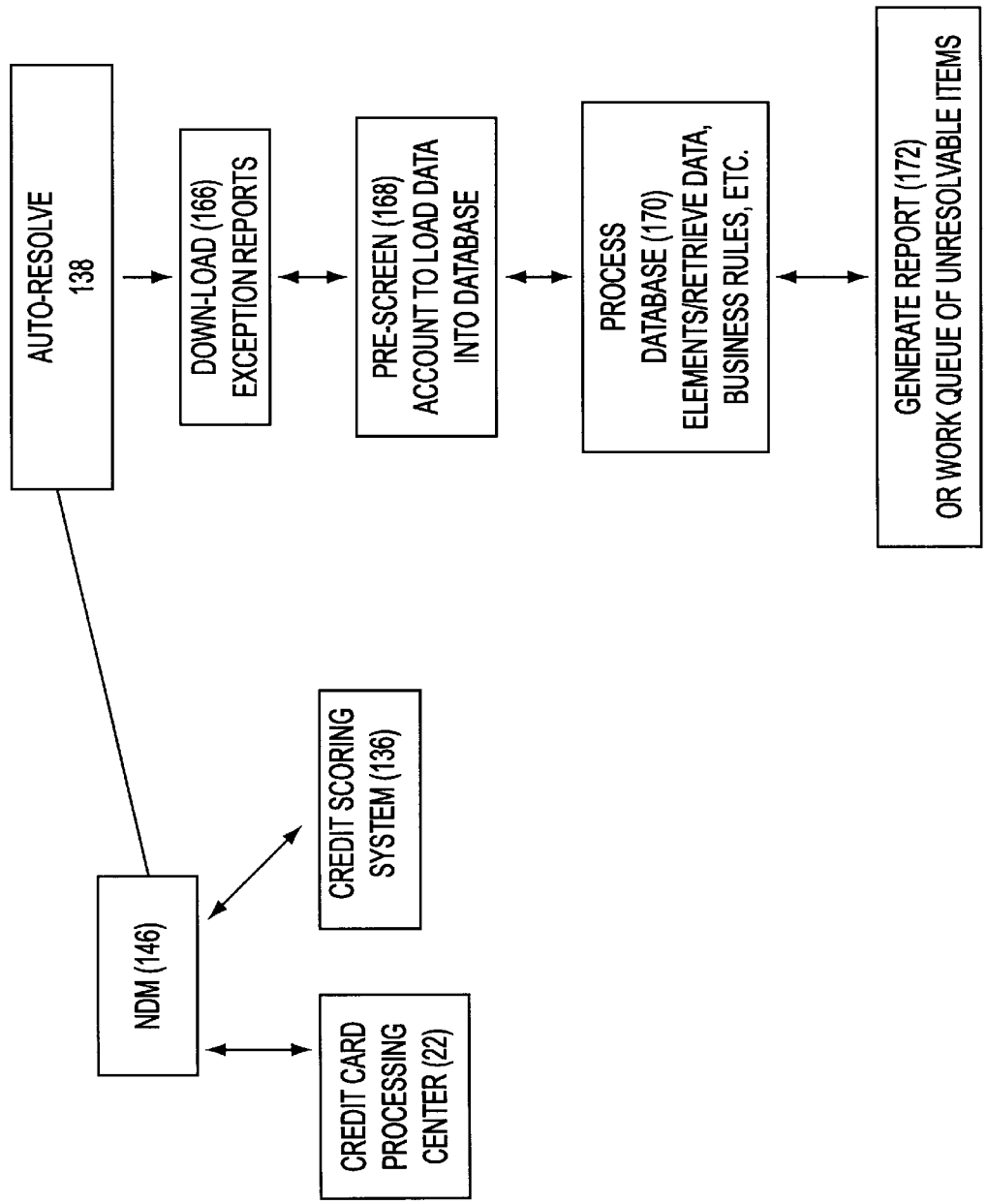
FIG. 4 is a block diagram of an Auto Resolve.

Auto Resolve (138) is the chargeback rule navigator as shown in FIG. 4. The Auto Resolve process automatically resolves inbound correspondences using business rules and pre-process the disposition of unresolvable cases. The process incorporates policies and procedures from multiple areas in the organization, supports multi-department needs and provides account activity updates to other departments of the organization. Account specific mathematical calculations are performed with minimum input from the representatives, resulting in highly accurate and efficient servicing. Examples of key support functions include:

complex finance charge adjustments consolidation of fee adjustments, and date calculations (for offering demographically targeted products).

Business policies are automatically enforced and are used to guide the customer service representatives as they navigate the work case (40). The chargeback rules and regulations of VISA™, MASTERCARD and other banking and transaction cards are imbedded in an expert system which automatically asks appropriate questions and generates the correct disposition as the customer service representative works the case (40). Changes to business policies and banking card regulations are implemented by the Auto Resolve (138) so they are centrally and automatically distributed and enforced.

The Auto Resolve process is a batch-oriented, unattended process which automatically processes exception reports, dispositions accounts, and creates a work list of unresolvable cases for human intervention. The auto resolve automatically downloads reports, pulls account data, and dispositions the account accurately based upon the business rules in the system. Employees are only required to manually review more challenging exceptions or cases which fall into 'gray' areas. There are four major processes of the Auto Resolve (138).

(1) Download of exception reports to the auto-process computer (166), (2) Pre-screen to load account data into database (168), (3) Process database elements using system (10) in the 'Auto-resolve' mode.

The system (10) retrieves data, business rules and policies, submits transactions, and marks database record with disposition (170); and (4) Generate report or work queue of unresolvable items for manual resolution (172).

The Network Data Mover (NDM) (146) functions as the communication gateway between the Auto Resolve (138) and the credit card processing center (22) and the credit scoring system (136). The NDM (146) transfers the report files of the credit card processing center (22) and the credit scoring system (136) to the Auto Resolve (138).

Figure 5:
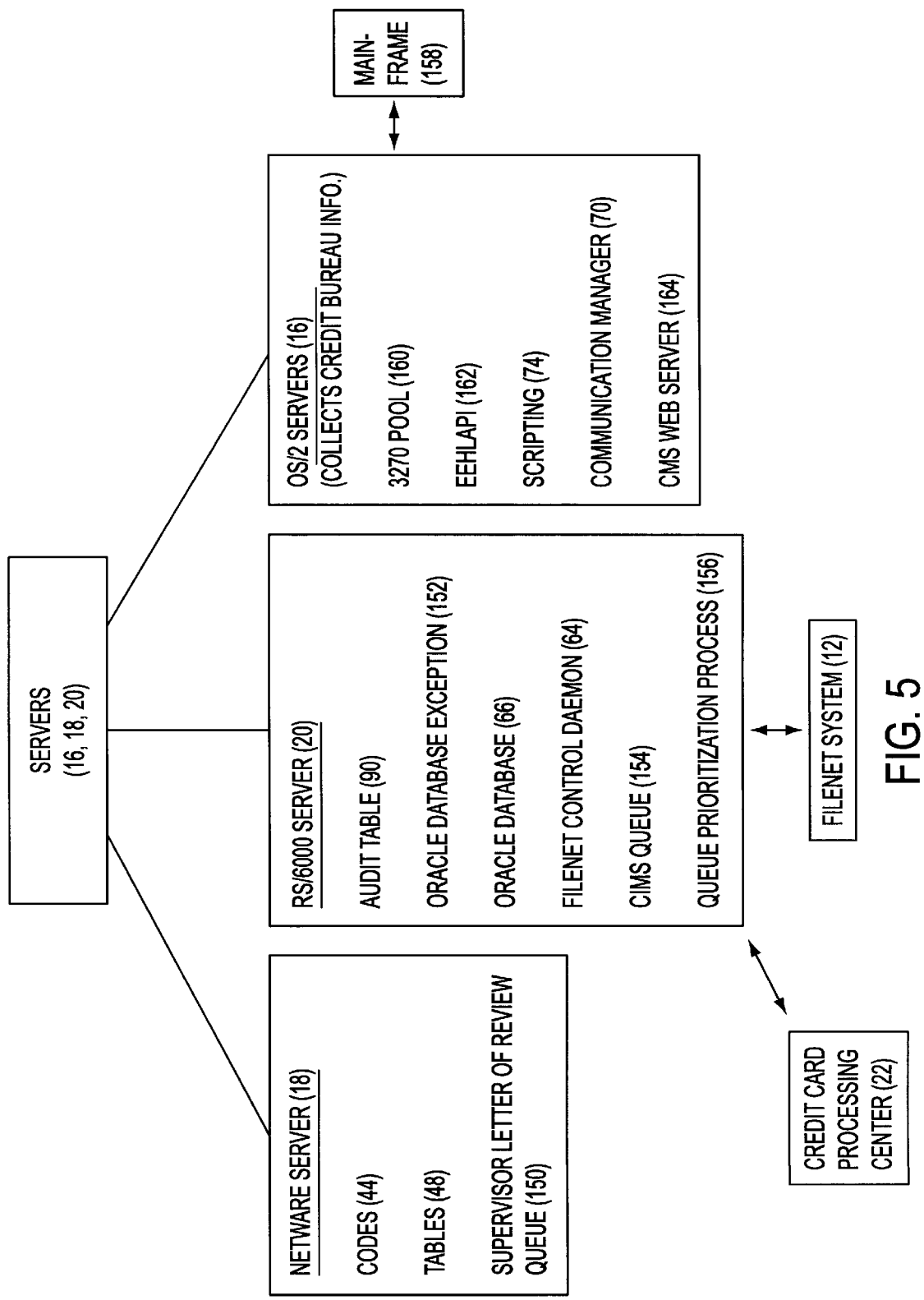
FIG. 5 is a block diagram of the servers of the system.

FIG. 5 illustrates the servers (16, 18, 20) of the system (10). The system (10) comprises three supporting servers, the Netware server (18), the RS/6000 Servers (20) and the OS/2 Server (16). Netware server (18) is where the codes (44), tables (48) and the supervisor letter of review queue (150) resides. The Netware is a server that is shared by all users of the system (10). When a new application is added to the system (10), the application actually resides in the Netware (18). The application may contain changes to alter the system's operation or to add, delete or amend the business rules and procedures. When making a change to an application on the system (10), there is no longer a need to go around and distribute the information to each individual computer. Now, the present invention permits the application to be placed on the system (10) through the Netware server (18), and when each computer is started by the user, the application changes are automatically loaded from the server (18) into the memory of the user's personal computer. Also, the Netware (18) includes the supervisor letter review queue (150). If the customer service representative creates a custom letter, the consumer letter is transferred to the supervisor review queue (150) where it will be reviewed and released by a supervisor before it actually prints.

The RS/6000 Servers (20) handle the communication between the Client Workstation (14) and the credit card processing center (22). The Audit Table (90) is a data security component of the RS/6000 Servers (20). Every time a user accesses an account, the system (10) logs the user's identification, who the user is and what actions where performed on the account by the user. The Oracle Database Exceptions (152), CIMS Queue (154), and the Queue Prioritization Process (156) are subroutines that deliver work cases that are non-image document into the system (10) to be resolved by customer service representatives. This type of request may be work from other departments delivered electronically into the Consumer Information Management System (CIMS) (154). This process enables data stored in a database in another department to be received in the FileNet System (12) in order to be processed automatically by the system (10). The non-image documents are called Non-Queue Index and Document Data (58). An example of a non-queue index and document (58) is a telephone request from a consumer to increase their credit limit. The telephone request is transmitted from the FileNet Control Daemon (64) which is a subroutine of the Oracle Database (66). The request would be automatically transferred from the RS/6000 server to the queuing mechanism (32) of the FileNet system where work cases are "pushed" to customer service representatives by the prioritizing algorithm. The external non-image documents (58) are placed into the system's queue (32) as 'dummy' entries to be resolved by the customer service representatives. The work case (40) appears to the representative to be just another document in the queue. The representative is unaware that the work case (40) was never an image document.

The Oracle Database (66) is a data storage resource for the system (10) located on the RS/6000 servers (20). In processing a request, the Oracle Database (66) accesses the credit card processing center to retrieve account information and delivers the information to the system (10).

OS/2 Servers (16) are the operating systems of the servers that collect the credit bureau information from the local credit scoring mainframe (158). The mainframe (158) is on-line with all the credit bureaus so that a credit report may be pulled and a real-time decision as to whether to increase a consumer's credit limit, for example, can be made. The credit bureaus could be TRW, Equifax, Trans Union, or any other credit bureau to which access has been previously authorized. The features contained within the OS/2 Servers (16) used to retrieve the credit bureau information are the 3270 Pool (160), EEHLLAPI (162) and the Communication Manager (70). The Client Workstation (14) makes a request to the servers (16, 18, 20) to retrieve the consumer's credit and/or account information. The OS/2 Servers (16) perform the EEHLLAPI Communication (162) to the mainframe (158) to retrieve the requested credit and/or account information. The OS/2 Servers (16) utilize a pool of 3270 screen (160) sessions to submit the request to the mainframe (158). The EEHLLAPI (162) links the Communication Manager (70) which contains the communication programs to the 3270 Pool (160). Once the requested information is retrieved from the mainframe (158), the OS/2 Servers (16) send a response containing the information to the Client Workstation (14). A single request for credit and/or account information may require the server to access numerous screens with data interaction. Scripting (74) which is a high level language controls what screens are accessed and what data is sent or retrieved. The CMS Web Servers (164) which are also stored in the OS/2 Servers (16) are the internal internet servers which contain all the data for the 'help' functions and other similar functions.

The present invention has been described in relation to particular embodiments which are intended all respects to be illustrative rather than restrictive. Alternative embodiments will become apparent to those skilled in the art to which the present invention pertains without departing from its spirit and scope.

What is claimed is:

1. A method using a computer system for automated resolution of a consumer's request wherein the system automatically applies the company's business-wide rules and policies in a uniform and consistent manner to resolve said consumer's requests and wherein said system includes a workstation and a data storing means comprising the steps of:

a) receiving said consumer's request into said system;
 b) transmitting an image document of said consumer's request to said workstation which is capable of processing non-formatted and formatted documents;
 c) converting said image document into computer readable information;
 d) processing said computer readable information to identify consumer identification information;
 e) processing said computer readable information to permit an operator to identify issues to be addressed in order to resolve said consumer's request;
 f) retrieving from said data storage means stored data which corresponds to said consumer identification information that pertains to said identified issues;
 g) retrieving from said data storage means stored chargeback rules and procedures which pertain to said identified issues;
 h) applying said chargeback rules and procedures to resolve without human intervention said identified issues;
 i) generating automatically a letter to said consumer which discusses the disposition of said identified issues, if said identified issues are automatically resolvable; and
 j) pending or redirecting said consumer's request for human resolution, if said identified issues are not automatically resolvable.

2. The method of claim 1 wherein said step of receiving said consumer's request into said system comprises receiving a non-image document or image document into said system.

3. The method of claim 2, further comprising the step of receiving non-image documents or image documents in the form of written correspondences, banking card transactions, credit card transactions, facsimile transactions, telephone requests and Internet correspondences.

4. The method of claim 3, further comprising the step of automatically scanning said written correspondences into said system and converting said scanned information into an image document.

5. The method of claim 3, further comprising the step of automatically scanning said written correspondences not containing a preset format into said system and converting said scanned information into an image document.

6. The method of claim 1, further comprising the step of receiving into said system a request concerning a consumer's account.

7. The method of claim 6, further comprising the step of receiving into said system said request concerning the amount charged, the fees charged, or the interest rate charged to said consumer's account.

8. The method of claim 1, further comprising the step of retrieving from said data storage means stored chargeback rules which address issues involving how to assess the amount to charge a consumer's account.

9. The method of claim 8, further comprising the step of assessing the amount to charge a consumer's account for charges not charged by the consumer, late payments, over charging a consumer's account, or for accrued interest rates.

10. The method of claim 1, further comprising the step of receiving into said system a request concerning a decline for a credit account, a decline to increase said consumer's credit limit or a denial to approve a credit or banking card transaction.

11. The method of claim 1, further comprising the step of identifying said consumer's identification information by said consumer's account number, consumer's name, consumer's address or magnum inquiry number.

12. The method of claim 1, further comprising the step of automatically generating a letter which contains the account number, letter code, letter variables, memos, greeting, salutation, and a written response which details the disposition of said consumer's request.

13. A method using a computer system for automated resolution of a consumer's request wherein the system automatically applies the company's business-wide rules and policies in a uniform and consistent manner to resolve said consumer's requests and wherein said system includes a workstation and a data storing means comprising the steps of:

a) receiving said consumer's request into said system;

b) transmitting an image document of said consumer's request to said workstation which is capable of processing non-formatted and formatted documents;

c) converting said image document into computer readable information;

d) processing said computer readable information to identify consumer identification information;

e) processing said computer readable information to permit an operator to identify issues to be addressed in order to resolve said consumer's request;

f) retrieving from said data storage means stored data which corresponds to said consumer identification information that pertains to said identified issues;

g) retrieving from said data storage means stored business rules and procedures which pertain to said identified issues; and h) applying said business rules and procedures to resolve without human intervention said identified issues.

14. A method using a computer system for automated resolution of a consumer's request wherein the system automatically applies the company's business-wide rules and policies in a uniform and consistent manner to resolve said consumer's requests and wherein said system includes a workstation and a data storing means comprising the steps of:

a) receiving said consumer's request into said system;

b) transmitting an image document of said consumer's request by electronic transmission to said workstation which is capable of processing non-formatted and formatted documents;

c) converting said image document into computer readable information;

d) processing said computer readable information to identify consumer identification information;

e) processing said computer readable information to permit an operator to identify issues to be addressed in order to resolve said consumer's request;

f) retrieving from said data storage means stored data which corresponds to said consumer identification information that pertains to said identified issues;

g) retrieving from said data storage means stored business rules and procedures which pertain to said identified issues;

h) applying said business rules and procedures to resolve without human intervention said identified issues; and i) pre-processing automatically the disposition of said identified issues, if said identified issues are not automatically resolvable.

15. A method using a computer system for automated resolution of a consumer's request wherein the system automatically applies the company's business-wide rules and policies in a uniform and consistent manner to resolve said consumer's requests and wherein said system includes a workstation and a data storing means comprising the steps of:

a) receiving said consumer's request into said system;

b) transmitting an image document of said consumer's request by electronic transmission to said workstation;

c) converting said image document into computer readable information;

d) processing said computer readable information to identify consumer identification information;

e) processing said computer readable information to permit an operator to identify issues to be addressed in order to resolve said consumer's request;

f) retrieving from said data storage means stored data which corresponds to said consumer identification information that pertains to said identified issues;

g) retrieving from said data storage means stored chargeback rules and procedures which pertain to said identified issues;

h) applying said chargeback rules and procedures to resolve without human intervention said identified issues;

i) automatically generating a letter to said consumer which contains the account number, letter code, letter variables, memos, greeting, salutation, and a written response which details the disposition of said consumer's request, if said identified issues are automatically resolvable; and j) pending or redirecting said consumer's request for human resolution, if said identified issues are not automatically resolvable.

16. The method of claim 15 wherein said step of receiving said consumer's request into said system comprises receiving a non-image document or image document into said system.

17. The method of claim 16, further comprising the step of automatically scanning said non-image document into said system and converting said scanned information into an image document.

18. The method of claim 15, wherein said consumer's request comprises a request concerning a consumer's account.

19. The method of claim 15, wherein said consumer's request comprises a request concerning a decline for a credit account, a decline to a request to increase said consumer's credit limit or a denial to approve a credit card or banking card transaction.

20. The method of claim 15, further comprising the step of identifying said consumer's identification information by said consumer's account number, said consumer's name, said consumer's address or magnum inquiry number.

* * * * *